US011182103B1

United States Patent
Avron et al.

(10) Patent No.: US 11,182,103 B1
(45) Date of Patent: Nov. 23, 2021

(54) DEDICATED COMMUNICATIONS CACHE

(71) Applicant: Amazon Technologies, Inc., Reno, NV (US)

(72) Inventors: Itai Avron, Petach Tikva (IL); Adi Habusha, Aloney Aba (IL); Uri Leder, Lotem (IL); Svetlana Kantorovych, Haifa (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/261,198

(22) Filed: Jan. 29, 2019

(51) Int. Cl.
*G06F 3/06* (2006.01)
*G06F 12/0806* (2016.01)
*G06F 12/0875* (2016.01)
*G06F 12/0873* (2016.01)

(52) U.S. Cl.
CPC ............ *G06F 3/0655* (2013.01); *G06F 3/061* (2013.01); *G06F 3/0673* (2013.01); *G06F 12/0806* (2013.01); *G06F 12/0873* (2013.01); *G06F 12/0875* (2013.01); *G06F 2212/60* (2013.01)

(58) Field of Classification Search
CPC ...... G06F 3/061; G06F 3/0631; G06F 3/0683; G06F 3/0688; G06F 3/0655; G06F 12/0888; G06F 12/0806; G06F 12/0873; G06F 12/0875; G06F 12/0897; G06F 3/0673; G06F 2212/60
See application file for complete search history.

(56) References Cited

U.S. PATENT DOCUMENTS

| | | | | |
|---|---|---|---|---|
| 5,247,648 | A * | 9/1993 | Watkins | G06F 12/0835 711/119 |
| 2002/0087801 | A1* | 7/2002 | Bogin | G06F 12/0835 711/137 |
| 2014/0229659 | A1* | 8/2014 | Jones | G06F 3/0659 711/103 |
| 2017/0123979 | A1* | 5/2017 | V | G06F 12/0804 |
| 2018/0059966 | A1* | 3/2018 | Lee | G06F 3/0631 |

* cited by examiner

*Primary Examiner* — Ernest Unelus
(74) *Attorney, Agent, or Firm* — Hogan Lovells US LLP (57) ABSTRACT

A dedicated input/output (I/O) cache can be used for I/O-to-processor communications. Data received from an I/O device can be written to the I/O cache and also written to a device memory that is accessible to the processor. The processor can then access the data in the fast, dedicated I/O cache if available. Otherwise, the processor can read the data from the memory into a conventional processor cache for processing. Writes to the cache can be full or partial, with partial writes utilizing padding in some embodiments. The data can be written sequentially in a circular manner. Data processed by the processor can be invalidated, and invalidated data can be overwritten on a subsequent write. Phase bits can also be used to indicate the pass during which various writes were performed.

20 Claims, 5 Drawing Sheets

DEDICATED COMMUNICATIONS CACHE

BACKGROUND

As computing technology continues to advance, an increasing amount of data is being processed and stored electronically. Due in part to the volume and complexity of this processing, it can be desirable to maximize processing performance. Conventional devices store input/output (I/O) data in memory, which then must be read into a traditional processor cache. This additional operation introduces latency into the processing, which negatively impacts performance. Further, the data in the processor cache is deleted once processed, and must be retrieved again if it is to be subsequently utilized by the processor, which can introduce further latency that further degrades performance.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for improved communications in a computing device. In particular, various embodiments utilize a dedicated input/output (I/O) cache for I/O-to-processor communications. Data received from an I/O device can be written to the I/O cache, enabling data to be cached without a corresponding read operation. The data is also written to a device memory accessible to the processor. The processor can then access the data in the fast, dedicated I/O cache if available. Otherwise, the processor can read the data from the memory into a conventional processor cache for processing. In writing to the I/O cache, the writes can be full or partial writes. Partial writes may utilize padding in at least some embodiments. The data can be written sequentially in a circular manner such that any write at the end of the cache address space can complete from the beginning of the address space. Data processed by the processor can be invalidated but left in the I/O cache. If invalidated, the data can be overwritten on a subsequent write. Phase bits can also be used to indicate the pass during which various writes were performed, in order to allow for a quick analysis of the data stored in the I/O cache.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
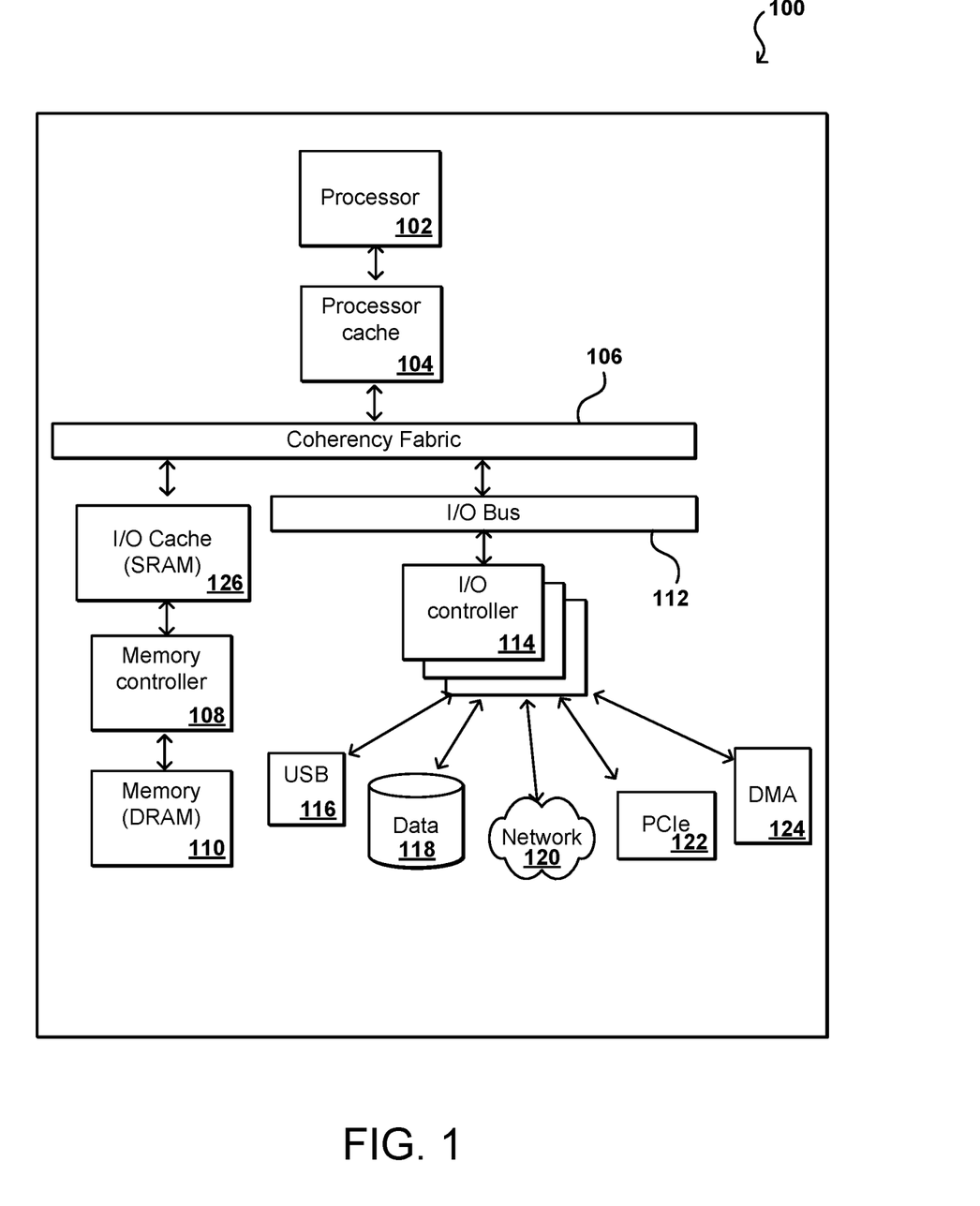
FIG. 1 illustrates components of an example computing device that can be utilized in accordance with various embodiments.

FIG. 1 illustrates components of an example computing device 100 that can be utilized in accordance with various embodiments. The example computing device includes at least one main processor 102, such as a central processing unit (CPU), that is able to obtain data from physical memory 110, such as a dynamic random access memory (DRAM) module, via a coherency fabric 106. It should be understood that various architectures can be utilized for such a computing device, that may include varying selections, numbers, and arguments of buses and bridges within the scope of the various embodiments. The data in memory 110 may be managed and accessed by a memory controller 108, such as a DDR controller, through the coherency fabric 106. The data may be temporarily stored in a processor cache 104 in at least some embodiments. The computing device 100 can also support multiple I/O devices using a set of I/O controllers 114 connected via an I/O bus. There may be I/O controllers to support respective types of I/O devices, such as a universal serial bus (USB) device 116, data storage 118 (e.g., flash or disk storage), a network card 120, a peripheral component interconnect express (PCIe) card 122, and a direct memory access (DMA) card 124, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 102 can help to manage the various I/O devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor 102 and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

The example device uses one or more interrupts in I/O to CPU communications. Interrupts enable I/O devices to notify the processor 102 when there is data to be transferred or an operation has completed, among other such possibilities. Such an approach enables the processor 102 to perform other tasks until immediate attention is required. The processor 102 can sense an interrupt request line after various instructions, and can transfer control to an interrupt handler routine in memory as needed. In some devices handshaking between the computing device and the I/O device is accomplished by polling. When polling, the processor can check the busy bit on the I/O device until it becomes clear, then set the write bit in the command register. The processor can set a command ready bit in the command register, which when detected can cause the I/O device controller to set the busy bit then read the command register, and output data read from the data-out register. This can continue until the device controller clears the busy bit, indicating that the operation has completed.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a System Basic Input/Output System (SBIOS) component. The SBIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The SBIOS component can also include or locate boot loader software that will be utilized to boot the host device. For example, in one embodiment, the SBIOS component can include executable code that, when executed by a processor, causes the host device to attempt to locate Preboot Execution Environment (PXE) boot software. Additionally, the SBIOS component can include or takes the benefit of a hardware latch that is electrically controlled by the I/O adapter device. The hardware latch can restrict access to one or more aspects of the SBIOS component, such controlling modifications or configurations of the executable code maintained in the SBIOS component. The SBIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g, a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the SBIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above in one embodiment, the hardware latches may be controlled together or independently.

In some embodiments the host device may execute a plurality of processes, such as virtual machines and a hypervisor. The I/O adapter device may include an offload pipeline for receiving and handing requests from the virtual machines. The I/O adapter device may also include one or more processor cores. The I/O adapter device may emulate a plurality of devices using the processor cores, such as virtual processor, and virtual network interface cards. The I/O adapter device may also include a management process. Each of the above-described components of the host device and the I/O adapter device may communicate using data paths over communication channel.

In various situations, the data from the I/O controllers will be written to memory 110. When the processor is ready to utilize the data, the processor 102 can obtain the data (i.e., by requesting from the memory controller 108) from the memory, or at least read the data into a processor cache 104 until the processor is ready to process the data. As mentioned, such an approach can have a negative impact on communications between an I/O device and the processor 102, due to latency effects of writing the I/O data to memory 110 and then having to retrieve the data from memory 110 to the processor 102. In one example, the I/O data (i.e., DMA or PCI data) is written to the memory 110 along with the appropriate completion descriptors. After writing the data to memory 110, an interrupt might be sent to the processor 102 or the processor might poll on the completion to determine that the completion descriptor is present in memory. At that point, the processor can obtain the data from memory and perform the appropriate computation(s). As mentioned, the polling by the processor can result in a significant delay in the processor being able to view the data, particularly if there is a heavy load on the memory. Further, if the processor polls the memory and causes the data to be placed into processor cache 104 the writing of the completion descriptor will cause that data to be invalidated in the processor cache. If the processor 102 needs to access the data, the processor will again need to poll the data from memory 110.

Approaches in accordance with various embodiments attempt to avoid this introduction of latency by utilizing an I/O cache for I/O-to-processor communications. In FIG. 1, the I/O cache is positioned along a path from the I/O controllers 114 to the memory controller 108 for the physical memory 110. The I/O cache can take the form of a write-through cache in at least some embodiments. Any I/O data received to the cache 126 can be written to the cache, but can also be passed along to the memory 110 to be written to the memory as well. It should be understood that other architectures, configurations, and paths can be used as well within the scope of the various embodiments. Further, in various embodiments the data will always be written to memory 110 but may only be written to the I/O cache when the cache is not full, as may result from a heavy load on the processor 102. By removing latency effects of polling the data, the overall performance can be improved, such as by increasing the rate of packet processing for I/O data that can be performed by the processor. If the data to be processed is stored in the I/O cache, the data can be much more quickly obtained by the processor 102. The data will already be available from the cache 126 without having to be read from the memory, as is the case for a conventional processor cache 104.

In the example configuration of FIG. 1, the I/O cache 126 is a dedicated cache structure for I/O traffic. The cache is positioned before the memory 110 and memory controller 108. Such an approach can be advantageous for situations such as I/O to CPU consumer-producer scenarios, where the I/O controller 114 writes data that the processor 102 needs to read with low latency, and will only use once before discarding. In some embodiments the cache 126 is a write-through cache with no read or write allocation, although other types of cache may be used to cache the I/O data as well as discussed elsewhere herein. There can be at least two scenarios in which I/O data can be written to the cache in various embodiments. In a first scenario, the writing can be performed for a full cache line, with no need to read any of the data from the DRAM. In a second scenario, a partial write can be performed to the cache, such as to the start of a cache line. A remainder of the cache line can then be padded to fill out the cache line as appropriate. The cache in such an implementation allows for circular ring writes, or completion writes, that are followed by writes to following addresses. Padding can be used to indicate when a remainder of a cache line is not needed, and can be indicated as invalid. The data can be indicated as invalid in one embodiment by inverting the original data, as it can hold a phase bit. Any following write that hits an allocated entry can be written to cache, without requiring the conditions above. As the cache is written through, an eviction policy can be utilized whereby only the corresponding entry is invalidated. Since all data written to the cache 126 will be used by the processor in sequential order, the cache 126 can be configured to retain older entries where possible, instead of evicting older data when new data arrives. Also, as the cached data is used only once by the processor 102, each time the processor 102 reads an entry from the cache that entry can be invalidated to free space for new writes. While a single cache is illustrated it should be understood that there can be multiple I/O caches in various embodiments, such as one per DDR channel.

In an example process that can be used to write I/O data to an I/O cache in accordance with various embodiments, data is written to the cache in a write-through fashion such that there is no need to perform a read to obtain the data to cache. This simplifies the implementation and improves performance relative to conventional read-based caching. Completion descriptors can be used as discussed herein. Because valid data is not removed from the cache, it can be beneficial in at least some embodiments to indicate whether data at a specific address range in the cache is from a current writing pass or the prior writing pass. Accordingly, approaches in accordance with various embodiments utilize a phase bit that is flipped between passes to the cache. The cache can determine whether to store the new data based on available capacity. If data is not invalidated by the processor, or the cache is otherwise full, the data will not be overwritten. The data may not have been invalidated because it has not yet been processed by the processor, as may be due to a current load on the process or another such factor. In this case, since the cache is full the new I/O data would not be written to cache but would instead only be written to the device memory. When that data is needed by the processor, the processor will need to read that data from the memory into conventional processor cache. As mentioned, data written previously is distinguished by the fact that the phase bits for that data have the even phase bit, which indicates an earlier write. It should be understood that the size and arrangement of the cache and writing process can differ between embodiments and the current example is simplified for purposes of explanation. Even though there may be valid and invalid data from different passes, a quick determination based on completion descriptors and phase bits can be used to determine the relevant data to be processed for each read. In this example, where part of the first write has been overwritten, it can be determined that the write is now invalid data as a portion of the write was overwritten. An approach that does not remove data from the cache when it is full can help to maintain performance, as there will be no need to first determine that the data is no longer in the cache and then read the data into cache for access.

In at least some embodiments the data will be fetched from memory, such as when it is determined that some or all of the data is not stored in the I/O cache. The data in the I/O cache was written without a fetch operation as in conventional approaches. Since older data is expected to be used before newer data, it can be preferable in at least some embodiments to hold the old data in cache, since the CPU will consume the data sequentially. It at least some embodiments, each instance of data (or cache entry) will arrive, or be received, with an appropriate phase bit (i.e., a valid indication). The data is not, in at least some embodiments, written to the I/O cache and followed by completion descriptor. Only the completion descriptor, or packet header, is cached in some embodiments. Padding can be used that sets the phase bits for all the entries a single cache line. In some embodiments, a circular FIFO structure is used for the caching, as the system is working at cache line granularity at the cache, while the granularity of the data itself may be less, such as 16 bytes in one example that includes the phase bit. In various embodiments, the I/O will set the phase bit as discussed herein.

Figure 2:
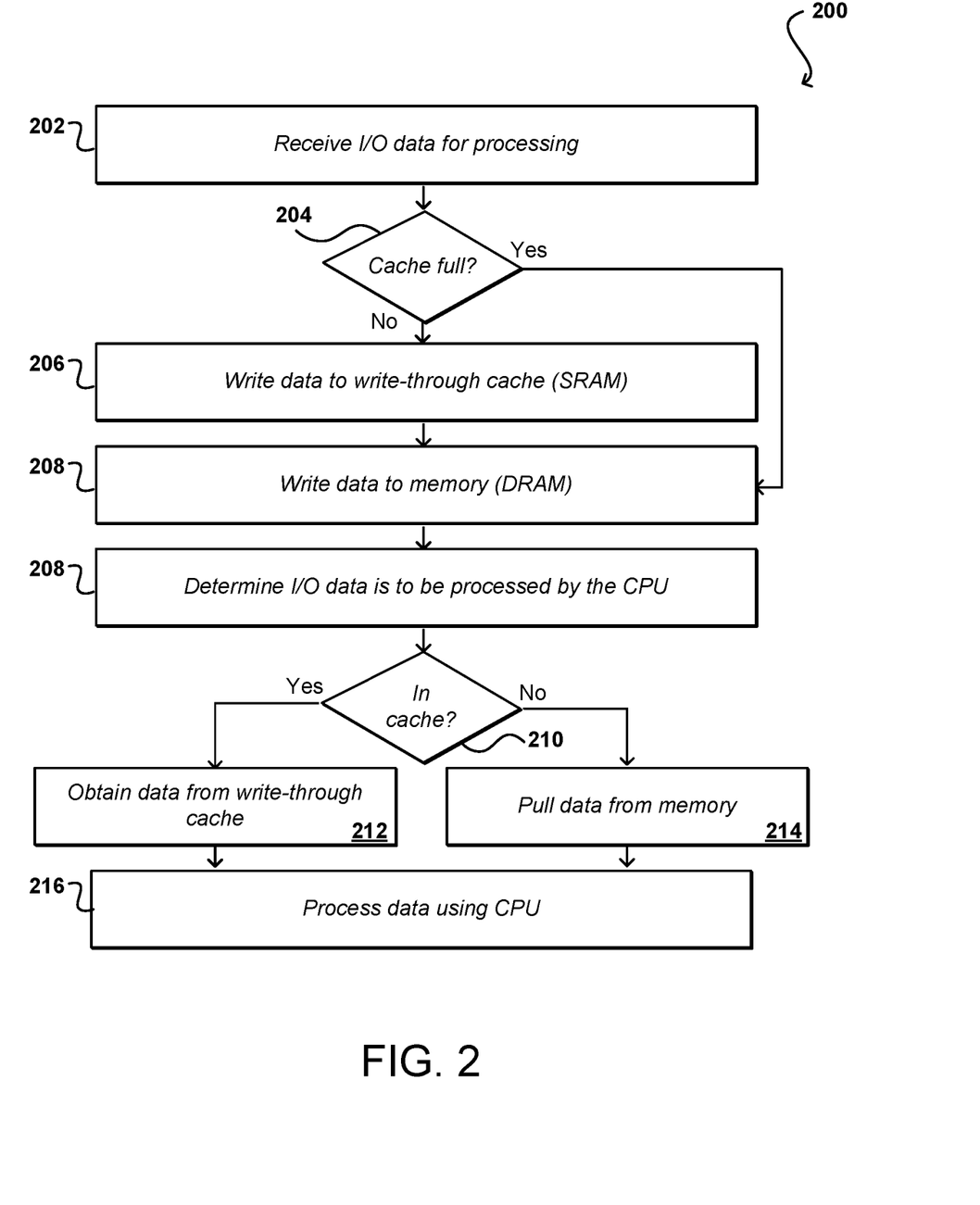
FIG. 2 illustrates an example process for utilizing an I/O cache for I/O-to-processor communications that can be utilized in accordance with various embodiments.

FIG. 2 illustrates an example process 200 for utilizing an I/O cache for I/O communications that can be utilized in accordance with one embodiment. It should be understood for this and other processes discussed herein that there can be additional, alternative, or fewer steps performed in similar or alternative orders, or in parallel, within the scope of the various embodiments unless otherwise stated. In this example, I/O data is received 202 for processing. This can be data from any of a number of I/O devices received through any appropriate I/O controller or other such mechanism. An attempt can be made to write the data to an I/O cache on a path from the I/O controller to the memory. A determination can be made 204 as to whether there is room in the cache for the data, or whether the cache is full. As mentioned, in this example data is not deleted from the cache until it is processed and invalidated by the processor, such that the cache may fill up and then new data is unable to be written to the cache until at least some of the cached data is invalidated. If the cache is not full, or it is determined there is enough room in the cache for the data, the I/O data can be written 206. The I/O cache can have an internal mechanism for determining how to store this data, which may utilize a hash function in some embodiments. A read fetch operation is not needed because either a full line was written, such that the data is overwritten anyway, or padding is used since it is known that the I/O writes sequentially and an operation for the rest of the cache line can be anticipated.

This allows the data to be stored to the cache without first requiring a read operation as with conventional caching. As mentioned, the cache can be implemented using a static random access memory (SRAM) module in some embodiments since the data will only be read once and fast access is desired. The SRAM can be on-chip with the processor in at least some embodiments. The data is also written 208 to device memory, such as to DRAM for the device. As mentioned, the I/O data will always be written to memory regardless of whether the data is also able to be written to the I/O cache.

After the I/O data has been written, it can be determined 208 that the I/O data is to be processed by the CPU or other such device processor. A determination can be made 210 as to whether the I/O data is available in the I/O cache. If so, the data can be obtained 212 from the I/O cache without a read operation from memory. If the data is not in the cache, or is only partially in the cache, then the data (or remaining portion of the data) can be read 214 from the device memory. As mentioned, this can include polling the DRAM and causing the data to be placed in a conventional processor cache in at least some embodiments. Once the processor has the data, the data can be processed 216 by the CPU. If the data was in the I/O cache then the data can be invalidated but left in the processor cache.

Figure 3:
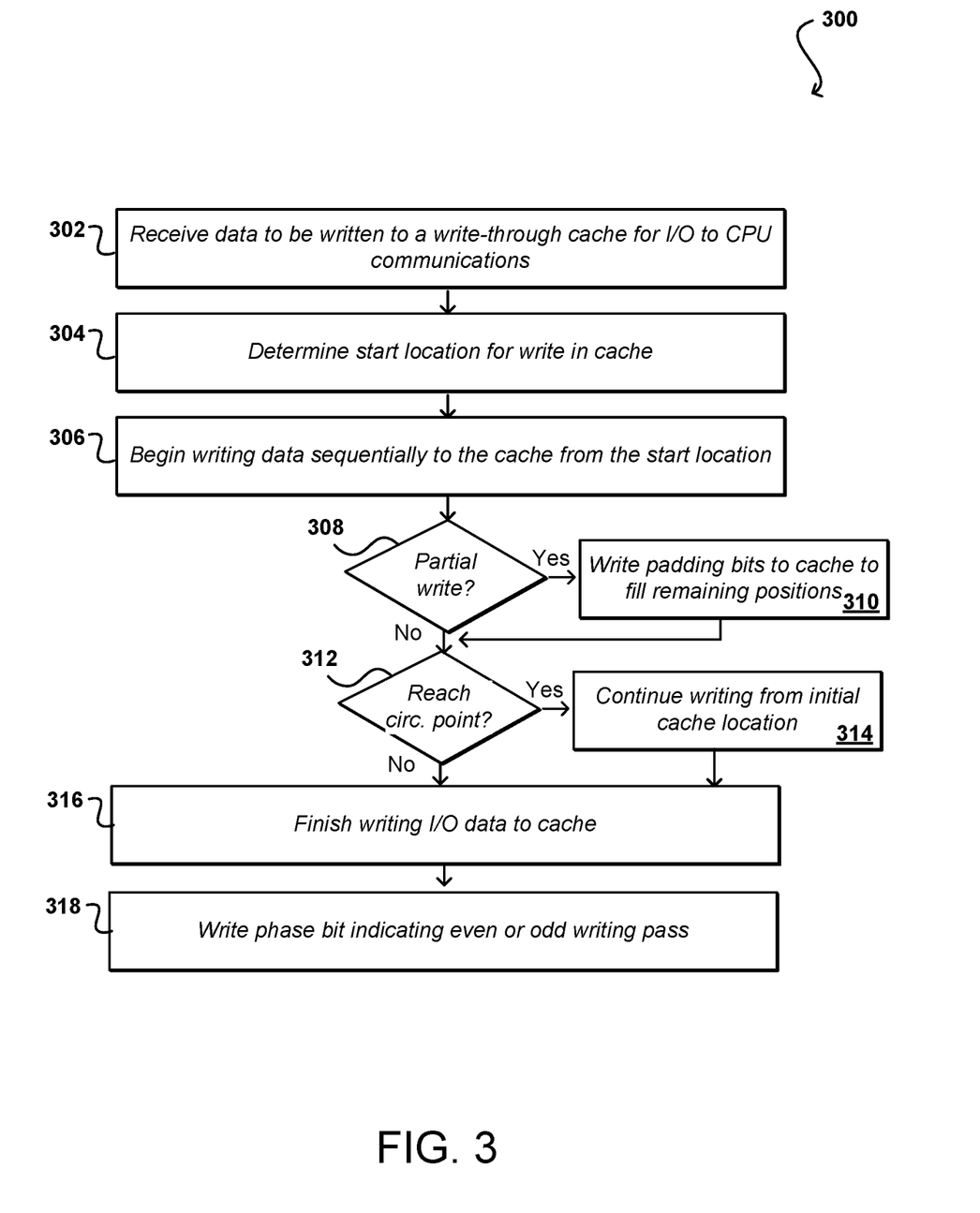
FIG. 3 illustrates an example process for writing data to an I/O cache that can be utilized in accordance with various embodiments.

FIG. 3 illustrates an example process 300 for writing I/O data to an I/O cache that can be utilized in accordance with various embodiments. In this example, data is received 302 to a device that is to be written to a I/O cache dedicated to I/O to CPU communications. As mentioned, there may be multiple caches for different data paths in some embodiments. A start location for the write in the cache can be determined 304. For example, an initial write can start at address 0, for example, and a subsequent write can start at an address immediately following the end address for the prior write. The data can then begin 306 to be written to the I/O cache sequentially from the determined start location. A determination can be made 308 as to whether the write is a full write or a partial write. If partial, padding can be used to mimic the phase bits and the data can be written without a fetch operation to storage. If, during the writing, the FIFO circulation point is determined 312 to have been reached then the writing of the data can continue 314 from an initial address, such as a circulation start position. As mentioned, such an approach follows a circular writing pattern that can wrap data from the end to the start of the cache address space. The writing of the I/O data can finish 316, and the data can also be written 318 to device storage. As mentioned, the data can include a phase that bit helps to determine how the data in the I/O cache should be interpreted, along with the padding and completion descriptors. Such an approach can continue, and the entry can be invalidated once it is processed by the appropriate processor. Once data is invalidated, it can be overwritten on a subsequent writing pass.

Figure 4:
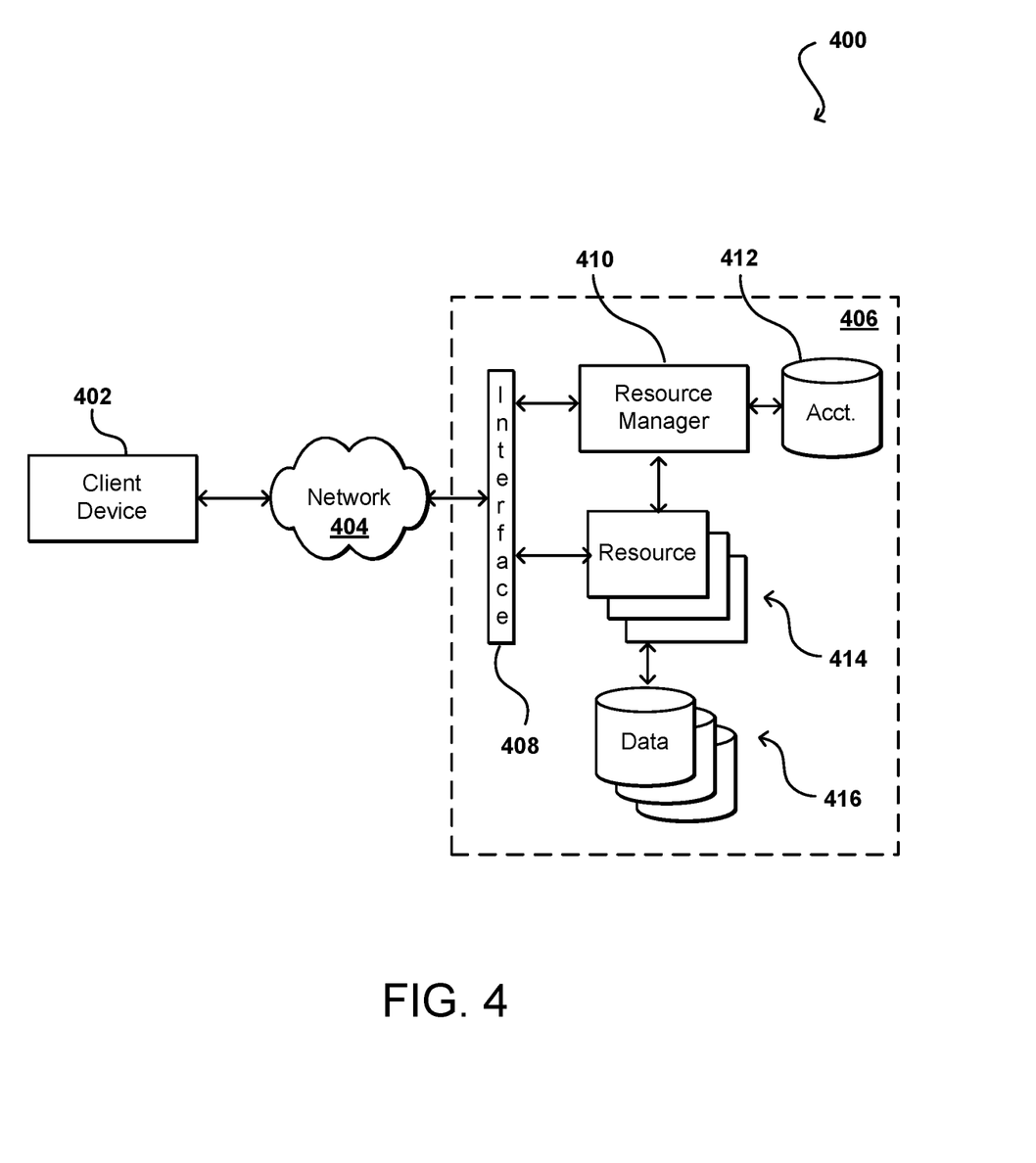
FIG. 4 illustrates an example environment in which aspects of the various embodiments can be implemented.

FIG. 4 illustrates an example environment 400 in which aspects of the various embodiments can be implemented. In this example a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
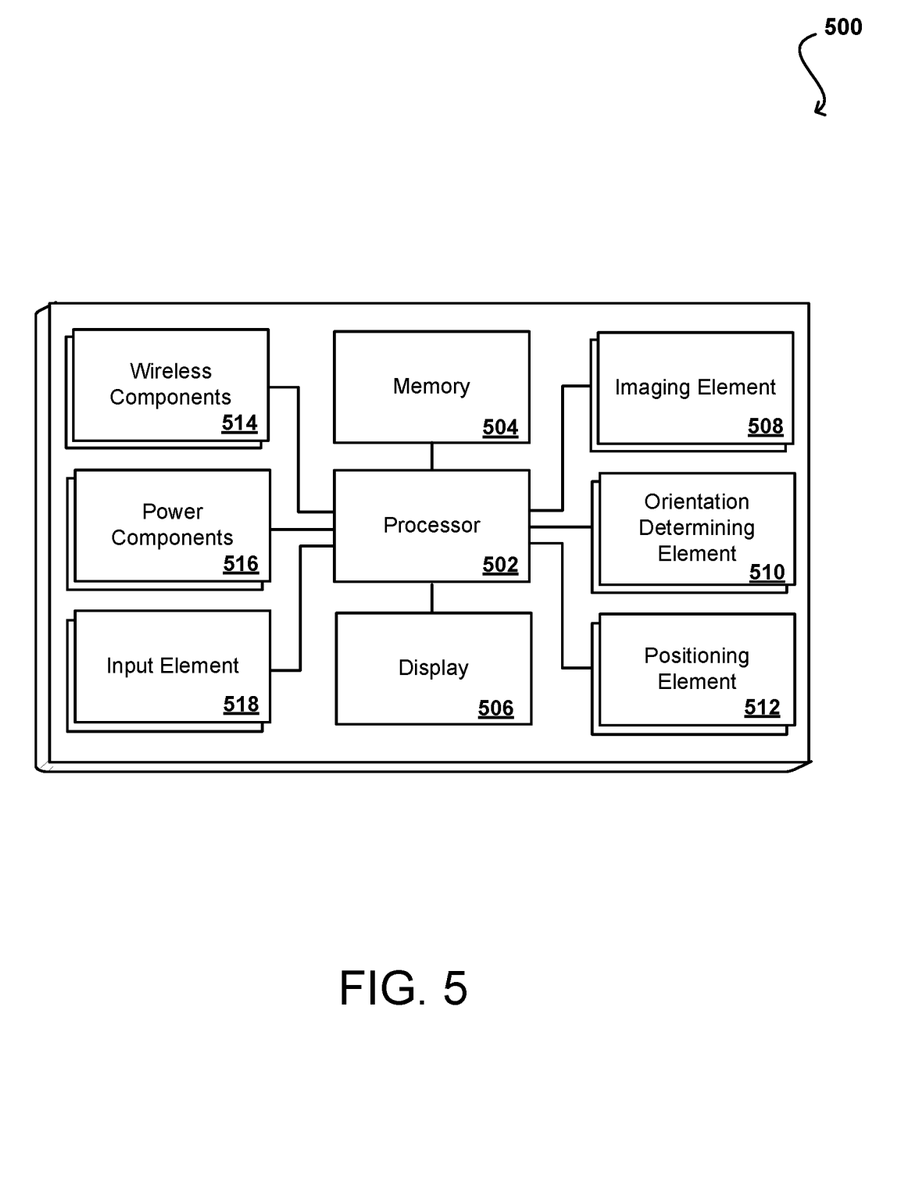
FIG. 5 illustrates example components of a computing device that can be used to implement aspects of the various embodiments.

FIG. 5 illustrates a set of basic components of an example electronic computing device 500 that can be used to implement aspects of the various embodiments. In this example, the device includes at least one processing unit 502 for executing instructions that can be stored in a memory device or element 504. As would be apparent to one of ordinary skill in the art, the device can include many types of memory, data storage, or computer-readable media, such as a first data storage for program instructions for execution by the processing unit(s) 502, the same or separate storage can be used for images or data, a removable memory can be available for sharing information with other devices, and any number of communication approaches can be available for sharing with other devices.

The device typically will include some type of display screen 506, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 508, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 500 also includes at least one orientation determining element 510 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 500. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 512 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 514 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 518 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a central processing unit (CPU);
   a CPU cache;
   a memory controller;
   a memory device;
   an input/output (I/O) controller for receiving I/O data from an I/O device; and
   an I/O cache that is a write-through cache dedicated to the I/O controller and configured to receive the I/O data from the I/O controller before the I/O data is written to the memory device, the I/O data being written to the I/O cache according to a circular and sequential write pattern, the I/O data being stored at the memory device via the memory controller, the memory controller being directly connected between the I/O cache and the memory device, wherein the CPU is configured to attempt to obtain the I/O data from the I/O cache, and wherein the CPU is further configured to cause at least a portion of the I/O data to be read from the memory device when less than all of the I/O data, stored to the memory device, is available from the I/O cache or the CPU cache.

2. The computing device of claim 1, wherein the CPU is configured to cause the I/O data in the I/O cache to be invalidated after processing.

3. The computing device of claim 1, wherein the memory device is a dynamic random access memory (DRAM) module and the I/O cache is a static random access memory (SRAM) module.

4. The computing device of claim 1, further comprising:
   adding padding data to mimic a phase bit for a partial cache line write.

5. The computing device of claim 1, wherein the I/O cache is configured to cache the I/O data corresponding to full cache line writes or partial cache line writes without fetching data from the memory device.

6. A computer-implemented method, comprising:
receiving data from an input/output (I/O) device, the data corresponding to a full cache line write or a partial cache line write;
writing the data, as the data is received from the I/O device, to an I/O cache, the I/O cache being a write-through cache dedicated to an I/O controller and separate from a processor cache, data for the partial cache line write being written to the I/O cache without a fetch operation being performed to obtain any portion of the data from a memory device, the data being stored at the memory device via a memory controller, the memory controller being directly connected between the I/O cache and the memory device;
writing the data to the memory device after the writing of the data to the I/O cache;
attempting, by a processor, to obtain the data from the I/O cache; and
causing at least a portion of the data to be read from the memory device when less than all of the data, stored to the memory device, is available from the I/O cache or the processor cache.

7. The computer-implemented method of claim 6, further comprising:
writing the data sequentially to the I/O cache according to a circular write pattern.

8. The computer-implemented method of claim 6, further comprising:
padding data to mimic a phase bit for the partial cache line write.

9. The computer-implemented method of claim 6, further comprising:
causing, by the processor, the data in the I/O cache to be invalidated after processing.

10. The computer-implemented method of claim 6, further comprising:
allocating space in the I/O cache for the full cache line write or the partial cache line write.

11. The computer-implemented method of claim 6, further comprising:
receiving subsequent data from the I/O device;
determining that there is an insufficient amount of free space in the I/O cache to write the subsequent data; and
writing the subsequent data to the memory device without writing the subsequent data to the I/O cache.

12. The computer-implemented method of claim 6, further comprising:
writing the data as a cache entry in the I/O cache as the data is received from the I/O device and without fetching the data from the memory device.

13. The computer-implemented method of claim 6, further comprising:
receiving the data from the I/O device through an I/O controller, the I/O device being one of a plurality of I/O devices in communication with the processor, the I/O devices having respective I/O controllers.

14. A system, comprising:
at least one processor;
a processor cache;
a memory controller;
a storage device;
an input/output (I/O) cache that is a write-through cache dedicated to an I/O controller and configured to receive I/O data from the I/O controller; and
memory including instructions that, when executed, cause the system to:
receive data from an input/output (I/O) device, the data corresponding to a full cache line write or a partial cache line write;
write the data, as the data is received from the I/O device, to the I/O cache, data for the partial cache line write being written to the I/O cache without a fetch operation being performed to obtain any portion of the data from the storage device, the data being stored at the storage device via the memory controller, the memory controller being directly connected between the I/O cache and the storage device;
write the data to the storage device after the writing of the data to the I/O cache;
attempt to obtain the data from the I/O cache; and
cause at least a portion of the data to be read from the storage device when less than all of the data, stored to the storage device, is available from the I/O cache or the processor cache.

15. The system of claim 14, wherein the instructions when executed further cause the system to:
write the data sequentially to the I/O cache according to a circular write pattern.

16. The system of claim 14, wherein the instructions when executed further cause the system to:
allocate space in the I/O cache for the full cache line write or the partial cache line write.

17. The system of claim 14, wherein the instructions when executed further cause the system to:
cause, by the processor, the data in the I/O cache to be invalidated after processing;
receive subsequent data from the I/O device;
determine that the data in the I/O cache corresponds to invalidated data; and
write the subsequent data to the I/O cache.

18. The system of claim 14, wherein the instructions when executed further cause the system to:
receive subsequent data from the I/O device;
determine that there is an insufficient amount of invalidated data in the I/O cache to write the subsequent data; and
write the subsequent data to the storage device without writing the subsequent data to the I/O cache.

19. The system of claim 14, wherein the instructions when executed further cause the system to:
pad data to mimic a phase bit for a partial cache line write.

20. The system of claim 14, wherein the I/O device is one of a plurality of I/O devices in communication with the processor, the I/O devices having respective I/O controllers.

* * * * *